United States Patent
Aizpuru et al.

(10) Patent No.: US 7,418,175 B2
(45) Date of Patent: Aug. 26, 2008

(54) COMPONENT FEATURE CAVITY FOR OPTICAL FIBER SELF-ALIGNMENT

(75) Inventors: Jose Joaquin Aizpuru, Murphy, TX (US); Danny Robert Schoening, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 29 days.

(21) Appl. No.: 11/086,146

(22) Filed: Mar. 22, 2005

(65) Prior Publication Data

US 2006/0051029 A1    Mar. 9, 2006

Related U.S. Application Data

(60) Provisional application No. 60/608,488, filed on Sep. 9, 2004, provisional application No. 60/617,315, filed on Oct. 8, 2004.

(51) Int. Cl.
*G02B 6/42* (2006.01)
*G02B 6/12* (2006.01)

(52) U.S. Cl. .............................. 385/52; 385/14; 385/15

(58) Field of Classification Search ............. 385/14–15, 385/52
See application file for complete search history.

(56) References Cited

U.S. PATENT DOCUMENTS

| 6,015,239 A * | 1/2000 | Moore ......................... 385/92 |
| 7,084,496 B2 * | 8/2006 | Benner et al. ............... 357/730 |
| 2004/0022487 A1 * | 2/2004 | Nagasaka et al. ............. 385/31 |
| 2004/0228588 A1 * | 11/2004 | Eldring et al. ................ 385/94 |

* cited by examiner

*Primary Examiner*—Kianni C Kaveh
(74) *Attorney, Agent, or Firm*—Workman Nydegger

(57) ABSTRACT

Optical fiber interfaces, apparatuses including the optical fiber interfaces, and methods for manufacturing the optical fiber interfaces. Optical fiber interfaces comprise a cup piece and a base piece. The cup piece includes an open first end for receiving an optical fiber end, and a second end includes an aligning protrusion. The base piece includes a top surface with an aligning cavity and an active optical device coupled to the base piece. The cup piece may be attached to the base piece. The base piece may be part of an outer housing portion of a transceiver or other optical component. The base piece may include a molded-in optical fiber interface and the cup piece may include a clearance cavity. A method for making the optical fiber includes locating the center of the active optical device and manufacturing the aligning cavity into the top surface of the base piece.

17 Claims, 7 Drawing Sheets

US 7,418,175 B2

COMPONENT FEATURE CAVITY FOR OPTICAL FIBER SELF-ALIGNMENT

CROSS-REFERENCE TO RELATED APPLICATIONS

This application claims the benefit of U.S. Provisional Application No. 60/608,488, entitled "Component Feature Cavity for Optical Fiber Self-Alignment" filed Sep. 9, 2004, and U.S. Provisional Application No. 60/617,315 entitled "Component Feature Cavity for Optical Fiber Self-Alignment" filed Oct. 8, 2004, the contents of both are hereby incorporated by reference.

BACKGROUND OF THE INVENTION

1. The Field of the Invention

The present invention relates generally to fiber optic communication. More specifically, the present invention relates to systems, apparatuses, and methods for coupling and aligning an optical fiber with a fiber optic device for optical signal communication.

2. The Relevant Technology

Fiber optic technology is increasingly employed in the binary transmission of data over communication networks. Networks employing fiber optic technology are (known as optical communications networks, and are typically characterized by high bandwidth and reliable, high-speed data transmission.

To communicate over an optical communications network using fiber optic technology, fiber optic components such as a fiber optic transceiver are used to send and receive optical data. Generally, a fiber optic transceiver can include one or more optical subassemblies ("OSA"), such as a transmitter optical subassembly ("TOSA") for sending optical signals, and a receiver optical subassembly ("ROSA") for receiving optical signals.

More particularly, the TOSA includes an active optical device that receives an electrical data signal and converts the electrical data signal into an optical data signal for transmission onto an optical network. The ROSA includes an active optical device that receives an optical data signal from the optical network and converts the received optical data signal to an electrical data signal for further use and/or processing. Both the ROSA and the TOSA include specific optical components for performing such functions.

In particular, a typical TOSA includes an optical transmitter such as a light emitting diode or a laser diode for transmitting an optical data signal to an optical fiber. A typical ROSA includes an optical receiver, such as a PIN photodiode or avalanche photodiode ("APD") that receives the optical data signal from an optical fiber and converts the optical data signal to an electrical data signal.

A typical optical cable has an optical fiber of high refractive index surrounded by a low-index cladding. In order for an optical transmitter to transmit an optical signal to an optical fiber the optical transmission of the optical transmitter must be aligned with a viewing window of the optical fiber. Likewise, in order for an optical receiver to receive an optical signal from an optical fiber the optical fiber must be aligned with the receiving surface of the optical receiver.

Referring now to FIG. 1, a conventional molded-in optical fiber interface 10 is shown for passive alignment of an optical cable 20 with a laser 30. As shown in FIG. 1, the optical fiber interface 10 has an incorporated plastic cup 11 for receiving an optical cable 20, and an incorporated plastic base portion 12. The optical cable 20 comprises an optical fiber 21 of high refractive index surrounded by a low-index cladding 22. The laser 30 is incorporated into the optical fiber interface 10 opposite the optical fiber end-face 24 for transmission of an optical signal to the optical fiber 21.

Manufacture of the molded-in optical fiber interface 10 shown in FIG. 1 typically includes several manufacturing processes such as molding, die attach, and lead frame etching. These manufacturing processes must be carefully controlled because they contribute to the overall tolerance for alignment of the laser 30 with the end-face 24 of the optical fiber 21.

The optical transmission of the laser 30 may typically be about 8 micron wide when it leaves an emission cavity 31 of the laser 30, and project to about 50 micron wide when it reaches the end-face 24 of the optical fiber 21. Assuming a relatively large 200 micron diameter optical fiber 21, the manufacturer would be allowed a 75 micron overall tolerance for alignment. One of ordinary skill in the art would recognize that a 75 micron overall tolerance does not allow much room for error in the stackable tolerances of each of the several manufacturing processes required to manufacture the molded-in optical fiber interface 10. Equipment for obtaining these stackable manufacturing tolerances can be expensive. Holding the overall tolerance may still be difficult using this expensive equipment.

The molded-in optical fiber interface 10 is illustrated in FIG. 1 where the stackable manufacturing tolerances for the various manufacturing processes have not been met. As a result, the emission cavity 31 of the laser 30 is not aligned on axis with the end-face 24 of the optical fiber 21 resulting in at least a portion of an optical transmission from the emission cavity 31 of the laser 30 to fall outside of the end-face 24 of the optical fiber 21. This misalignment would likely result in a yield loss. The risk of losing the overall tolerance resulting in misalignment during the manufacturing processes further increases as the diameter of the optical fiber 21 becomes smaller, and also as the optical transmission of the laser 30 becomes more narrow and defined (e.g. a laser as compared to a LED).

Typically, in the case of a misaligned molded-in optical fiber interface the optical component incorporating the misaligned optical fiber interface must be discarded. Thus, the optical component along with any nonrecoverable components, for example at least the VCSEL and housing incorporating the molded-in optical fiber interface, would be wasted.

Therefore, in recognition of the foregoing, and other, problems in the art, apparatuses and methods for manufacturing the apparatuses are described allowing for more accurate and economic alignment of an active optical device with an optical fiber.

SUMMARY OF THE INVENTION

Briefly summarized, embodiments of the present invention are directed to optical fiber interfaces, apparatuses incorporating the optical fiber interfaces, and methods for manufacturing the optical fiber interfaces. The optical fiber interfaces comprise a cup piece and a base piece. The cup piece includes a first end and a second end. The first end includes an opening for receiving an optical fiber end and the second end includes an aligning protrusion. The base piece includes a top surface including an aligning cavity. An active optical device, such as an optical transmitter or optical receiver, is coupled to the base piece. The cup piece may be attached to the base piece using epoxy, or other suitable means such that the aligning protrusion is received by the aligning cavity and an active center of the active optical device is optically aligned with the optical fiber. The base piece of the optical interface is a portion of a housing of a transceiver or other higher-level optical assembly.

The present invention may be used to reconfigure a component including a molded-in optical fiber interface. In this embodiment, the base piece may include a molded-in optical fiber interface and the cup piece may include a clearance cavity allowing space for alignment of the cup piece and the active optical device. According to other embodiments, the molded-in optical fiber interface may be removed, such as during the manufacture of the aligning cavity.

Example methods for manufacturing an optical fiber interface include locating an active center of the active optical device and manufacturing an aligning cavity into the base piece and including a clearance cavity in the second end of the cup piece. The aligning cavity is located about the active optical device and when the cup piece is attached to the base piece, such that the aligning protrusion is closely received by the aligning cavity, an active center of the active optical device is aligned relative to an optical fiber end-face received by the first end of the cup piece. The method may first include determining that a molded-in optical fiber interface is not sufficiently aligned.

These and other features of the present invention will become more fully apparent from the following description and appended claims, or may be learned by the practice of the invention as set forth hereinafter.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, includes the claims, or may be learned by the practice of the invention.

Figure 2:
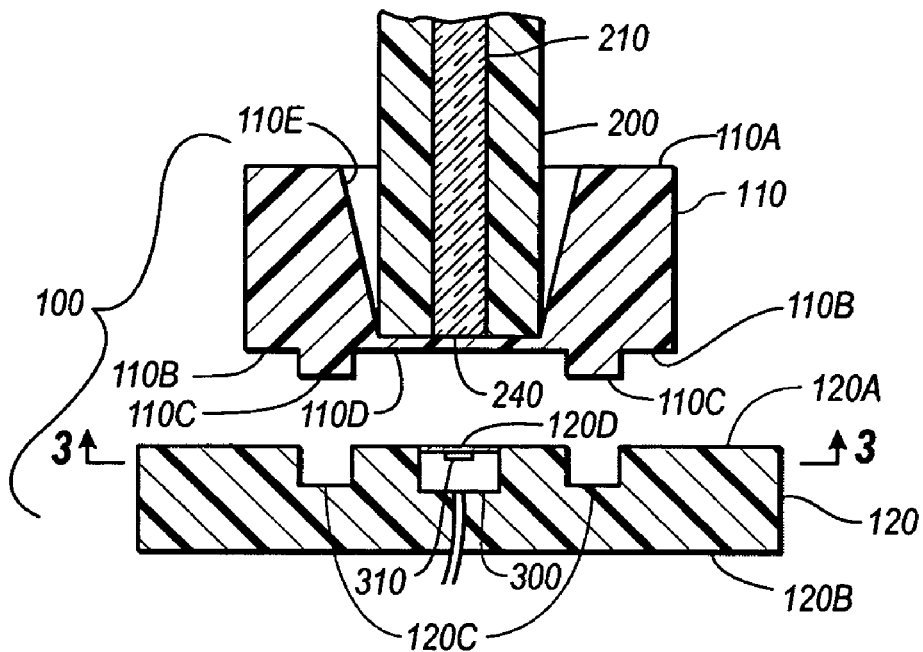
FIG. 2 illustrates a cross-sectional view of a self-aligning optical fiber interface according to an example embodiment of the present invention.

FIG. 2 illustrates a cross-sectional side view of an example embodiment of the present invention. A self-aligning optical fiber interface 100 is shown for receiving an optical cable 200 and aligning the optical cable 200 with an active optical device, in this case a vertical cavity surface emitting laser ("VCSEL") 300. The self-aligning optical fiber interface 100 includes a cup piece 110 and a base piece 120. The base piece 120 may represent, for example, a portion of the outer housing of an optical component, such as a transceiver, or other optical communication assembly. The cup piece 110 has a first end 110A and a second end 110B. The first end 110A includes an opening 110E that is sized and configured to receive the optical cable 200. The second end 110B includes an aligning protrusion 110C.

The base piece 120 has a top surface 120A and a bottom surface 120B. The VCSEL 300 is coupled to the base piece 120 by being incorporated within the top surface 120A of the base piece 120 using a manufacturing process. The base piece 120 further includes an aligning cavity 120C that is sized and configured to receive the aligning protrusion 110C of the cup piece 110, thereby locating the cup piece 110 on the base piece 120 such that an optical transmission of the VCSEL 300 is optically aligned with the end-face 240 of the optical fiber 210.

According to the example embodiment illustrated in FIG. 2, the VCSEL 300 is recessed below the top surface 120A of the base piece 120. As a result, at least a thin portion 120D of the top surface 120A covering the emission cavity 310 of the VCSEL 300 is made of an at least partially transparent material, thereby allowing for the VCSEL 300 to transmit an optical signal through the thin portion 120D of the base piece 120 and to the end-face 240 of the optical fiber 210. The top surface of the thin portion 120D may be an optical plane created, for example, by a manufacturing process such as diamond turning.

Similarly, according to the example embodiment shown in FIG. 2, the bottom of the cup piece 110B is closed allowing for the fiber optic end-face 240 to abut against a thin wall 110D. As a result, at least the portion of the thin wall 110D aligned with the end-face 240 of the optical fiber 210 is made of an at least partially transparent resilient plastic material, thereby allowing for transmission of an optical signal through the portion of the thin wall 110D and to the end-face 240.

It would be apparent to one of ordinary skill in the art in view of this disclosure that a hole, lens, or other optically transmissive means, may be incorporated in the thin portion 120D of the base piece 120, and/or in the thin wall 110D of the cup piece 110, thereby allowing for transmission of the optical signal from the VCSEL 300 to the end-face 240 of the optical fiber 210. In addition, the VCSEL 300 may be coupled to the base piece 120 in a different manner. For example, the VCSEL may be only partially incorporated within the base piece 120, may be coupled to the top surface 120A of the base piece 120, or may be coupled to a another component, such as a header, that is coupled to the base piece 120. Such example embodiments are also included within the scope of the present invention.

According to example embodiments of the present invention, the opening 110E of the cup piece 110 may be sized and configured to accommodate different widths and configurations of optical cable 200, while still including an alignment protrusion 110C having the same size, shape, and configuration for location and attachment to the base piece 120.

Figure 3:
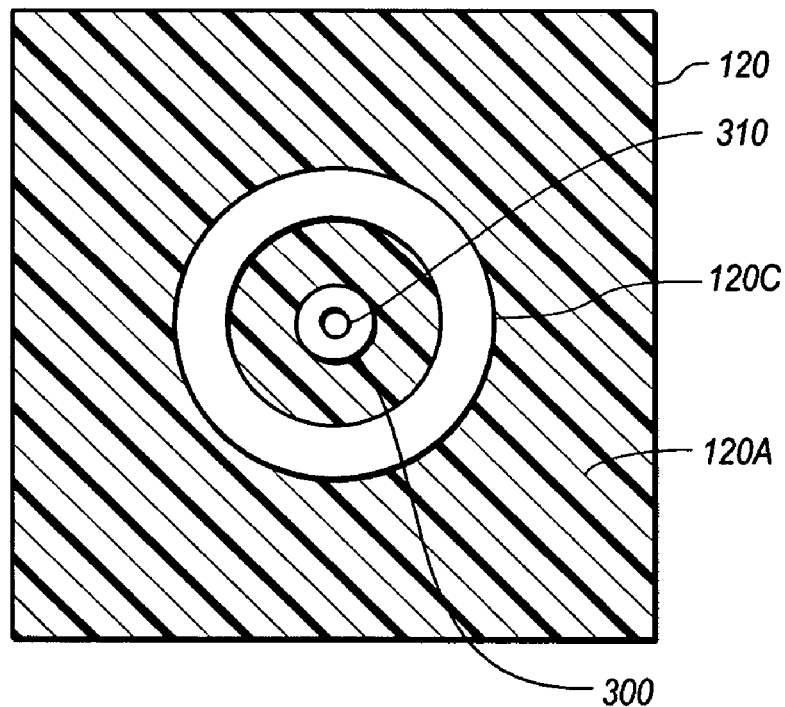
FIG. 3 illustrates a top cross-sectional view of a base piece according to an example embodiment of the present invention.

Referring now to FIG. 3 a top cross-sectional illustration of the base piece 120 is shown. As shown, the aligning cavity 120C is a substantially circular halo-shaped cavity located in the top surface 120A of the base piece 120 and centered about an active center of the emission cavity 310 of the VCSEL 300. The VCSEL 300 is shown as a circular shape in FIG. 3, but the VCSEL 300 may be any shape, such as rectangular, square, or other shape, as is common in the manufacturing of a VCSEL 300.

Figure 4:
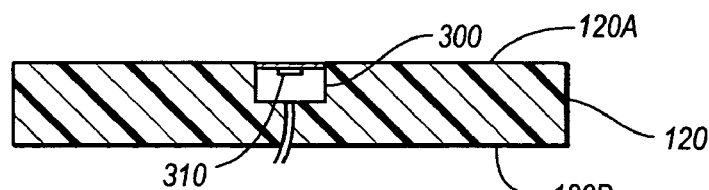
FIG. 4 illustrates a cross-sectional view of a blank base piece prior to a manufacturing process according to an example embodiment of the present invention.
Figure 5:
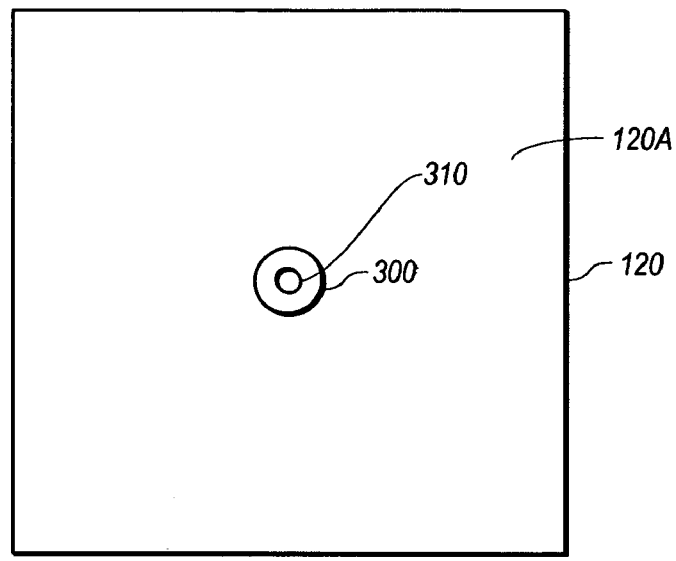
FIG. 5 illustrates a blank base piece from a top surface view prior to a manufacturing process according to an example embodiment of the present invention.

With cross-reference to FIGS. 2, 4, 5 and 6, an example manufacturing process in a method of manufacturing the self-aligning interface 100 according to an embodiment of the present invention will now be described. FIGS. 4 and 5 depict a blank base piece 120 from a side cross-sectional view and a top surface view respectively. The base piece 120 may be molded, for example, out of a resilient plastic material and includes an active optical device, in this case a VCSEL 300 incorporated below the top surface 120A using a manufacturing process as is known to one of ordinary skill in the art. The base piece 120 may represent a portion of the outer housing of an optical component, such as a transceiver, or other optical transmission assembly.

Figure 6:
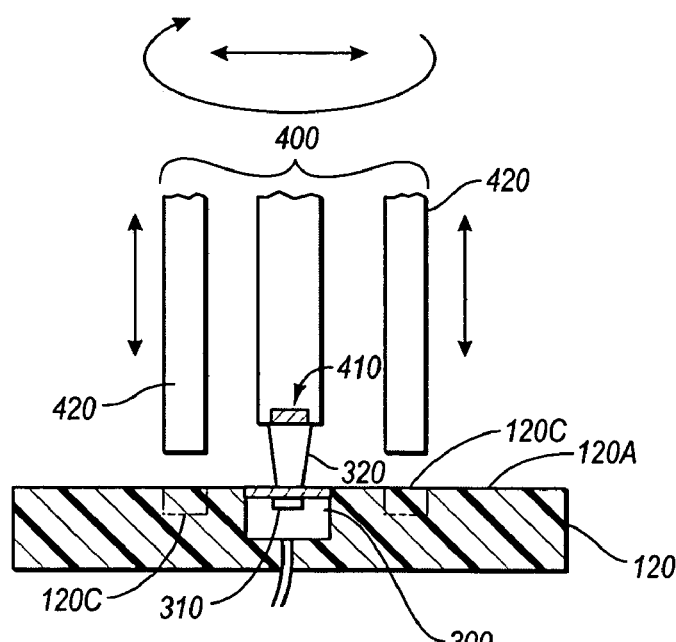
FIG. 6 illustrates a cross-sectional view of an example manufacturing process for locating the active center of an active optical device and boring an aligning cavity about the active center according to an example embodiment of the present invention.

Referring now to FIG. 6, a cross-sectional view of an example manufacturing process is illustrated for locating the active center of an optical transmission 320 of the VCSEL 300 and creating the aligning cavity 120C about the active center of the optical transmission 320. The active center of an active optical device is a location where alignment of an optical fiber end-face with an active optical device results in effective optical signal transmission without unacceptable yield loss.

According to this embodiment, a visual-mechanical toolset 400 locates the active center of the optical transmission 320 of the VCSEL 300 using an optical sensor 410. After locating the active center of the optical transmission 320 of the VCSEL 300, the visual-mechanical toolset 400 lowers a mechanical tool 420 that bores the aligning cavity 120C in the top surface 120A of the base piece 120, thereby aligning the aligning cavity 120C in relation to the active center of the optical transmission 320 of the VCSEL 300. The mechanical tool 420 may be a spinning metallic boring tool as shown in FIG. 6, or may be any other manufacturing tool for creating the aligning cavity 120C as would be apparent to one of ordinary skill in the art in view of this disclosure.

Referring again to FIG. 2, the cup piece 110 may be machined or molded, for example, so that the aligning protrusion 110C is closely received within the aligning cavity 120C of the base piece 120. Using the method of manufacture according to this embodiment of the present invention may allow for more accurate alignment of the emission cavity 320 of the VCSEL 300 after the VCSEL 300 has been coupled to the base piece 120.

Referring still to FIG. 2, once the aligning cavity 120C has been machined into the top surface 120A of the base piece 120, attaching means, such as epoxy, adhesive, or glue, is used to attach the cup piece 110 to the base piece 120. For example, epoxy may be placed within the aligning cavity 120C, or about the bottom 110B of the cup piece 110. Subsequently, the cup piece 110 may be pressed tightly against the base piece 120, with the aligning protrusions 110C being closely received by the aligning cavity 120C, until the epoxy hardens. Other means for attaching the cup piece 110 to the base piece 120 may be used such as screws, bolts, press-fit or snap-fit engagements, adhesives, and welds, for example. Epoxy may be used to fill voids for both mechanical strength purposes and for optical purposes.

Figure 7:
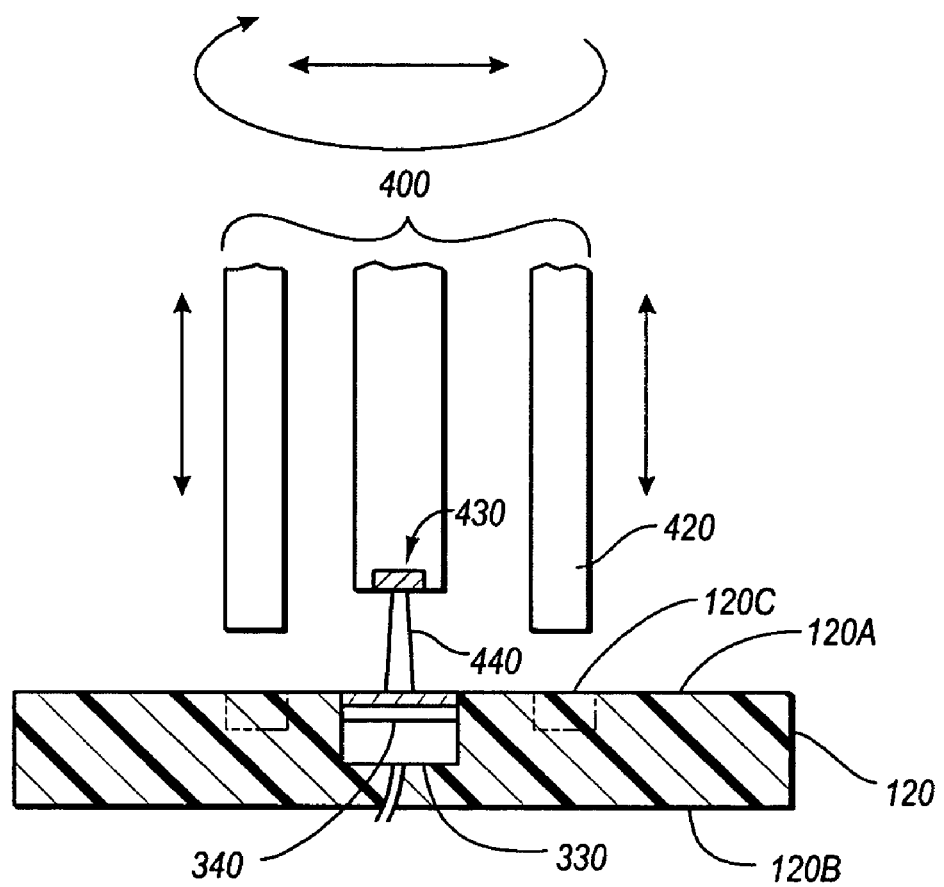
FIG. 7 illustrates a cross-sectional view of a manufacturing process for locating the active center of an active optical device and boring an aligning cavity about an active center according to an example embodiment of the present invention.

Referring now to FIG. 7, a manufacturing process in a method of manufacturing a self-aligning interface according to an example embodiment of the present invention is shown. FIG. 7 illustrates an example manufacturing process for locating the active center of an active optical device, in this case an optical receiver 330, such as a photodiode, and creating the aligning cavity 120C centered about an active receiving surface 340.

According to this example embodiment, a visual-mechanical toolset 400 locates the active center of the receiving surface 340 of the optical receiver 330 by producing an optical transmission 440 from an optical transmitter 430, and sensing the optical transmission 440 using the optical receiver 330. After locating the active center of the receiving surface 340 where the optical receiver 330 receives an effective amount of power from the optical transmission 440, the visual-mechanical toolset 400 lowers a mechanical tool 420, in this case a boring tool, that bores the aligning cavity 120C into the top surface 120A of the base piece 120. The mechanical tool 420 may be a spinning metallic boring tool as shown in FIG. 6, or may be any tool for creating the aligning cavity 120C.

Aligning means have been described as an aligning protrusion and an aligning cavity in the shape of a halo. However, example embodiments of the present invention include aligning means comprising other shapes and configurations. For example, aligning pins, keyholes, or sliding sleeves may also be used to align and attach a cup piece to a base piece according to example embodiments of the present invention. Moreover, aligning protrusions and aligning cavities maybe eliminated where a cup piece may be aligned and attached to a base piece directly by glue, epoxy, fasteners, or a snap-fit engagement. Such example embodiments are included within the scope of the present invention.

Figure 8:
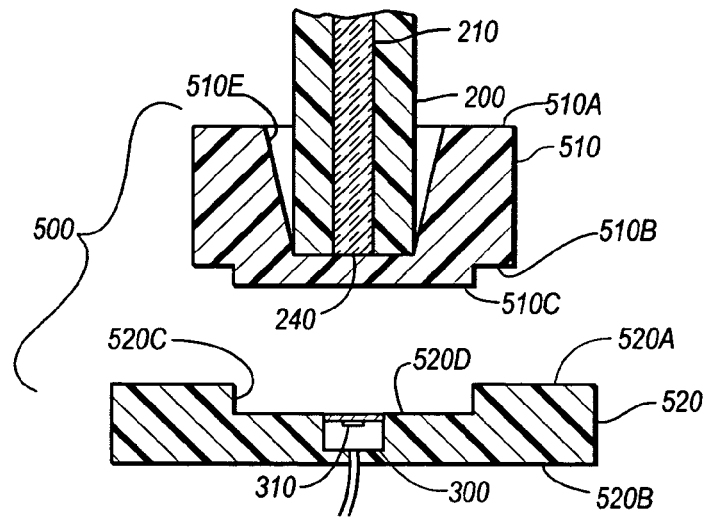
FIG. 8 illustrates a cross-sectional view of a self-aligning optical fiber interface according to an example embodiment of the present invention.

Referring now to FIG. 8, an example embodiment of the present invention is illustrated where an aligning cavity 520C and an aligning protrusion 510C have substantially circular cross-sectional shapes. A cup piece 510 has a first end 510A and a second end 510B. The first end 510A includes an opening 510E that is sized and configured to receive the optical cable 200. The second end 510B includes the substantially circular shaped aligning protrusion 510C.

The base piece 520 has a top surface 520A and a bottom surface 520B. A VCSEL 300 is coupled to the base piece 520 by being incorporated within a bottom surface 520D of the aligning cavity 520C. The aligning cavity 520C is sized and configured to closely receive the substantially circular aligning protrusion 510C of the cup piece 510, thereby locating the cup piece 510 on the base piece 520 such that the active center of a VCSEL 300 is optically aligned with the end-face 240 of the optical fiber 210. The portion of the bottom surface 520D of the aligning cavity 520C located above the VCSEL 300 is an optical plane that may be created, for example, by a manufacturing process such as diamond turning.

Figure 9:
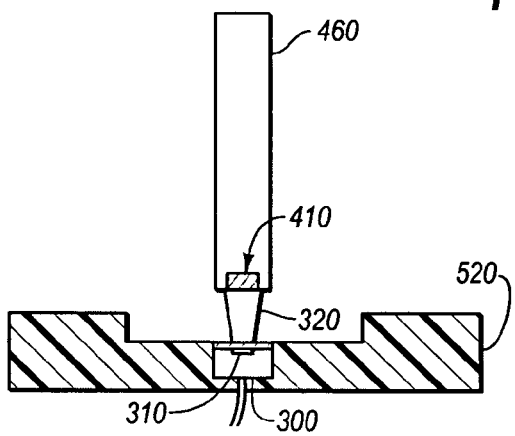
FIG. 9 illustrates a cross-sectional view of an example manufacturing process for locating the active center of an active optical device according to an example embodiment of the present invention.
Figure 10:
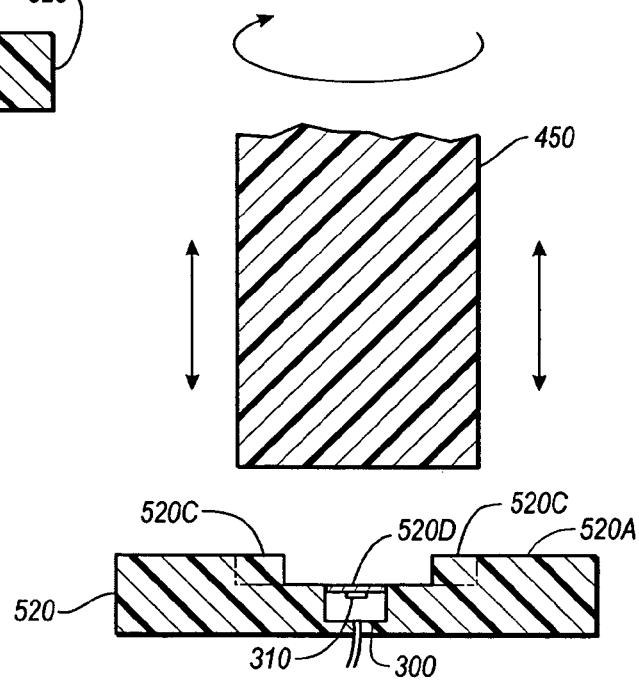
FIG. 10 illustrates a cross-sectional view of an example manufacturing process for machining an aligning cavity about the active center of an active optical according to an example embodiment of the present invention.

With cross-reference to FIGS. 9 and 10, an example two step process in a method of manufacturing the self-aligning optical fiber interface 500 is illustrated according to an example embodiment of the present invention. As shown in FIG. 9, a sensor 460 locates the active center of the optical transmission 320 of the VCSEL 300 using an optical sensor 410. After locating the active center of the optical transmission 320 of the VCSEL 300, a mechanical tool, in this case a flat bottom drilling tool 450, creates a countersunk aligning cavity 520C in the top surface 520A of the base piece 520 thereby aligning the aligning cavity 520C about the active center of the emission cavity 310 of the VCSEL 300.

The mechanical tool may be a spinning metallic flat bottom drilling tool 450 where the flat bottom drilling tool 450 creates a substantially circular countersunk aligning cavity 520C just above where the surface 520D has been diamond turned. The tool may be any other manufacturing tool for creating the aligning cavity 520C as would be apparent to one of ordinary skill in the art in view of this disclosure. Moreover, the two step process may be combined into a single process using an incorporated visual-mechanical toolset similar to that discussed above with reference to FIGS. 6 and 7.

Figure 11:
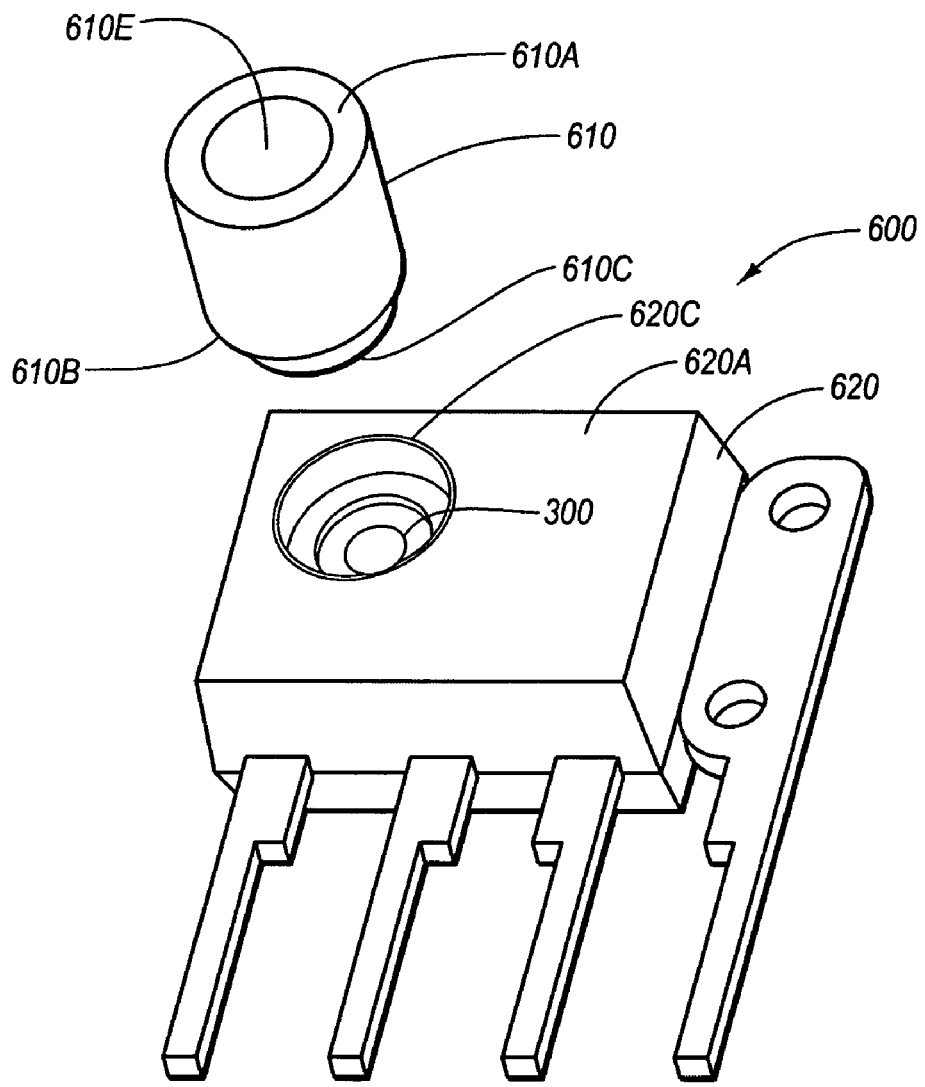
FIG. 11 illustrates a perspective view of an optical communication component incorporating the self-aligning optical fiber interface according to an example embodiment of the present invention.

As discussed above, the self-aligning optical fiber interfaces of the present invention may be incorporated into an optical assembly or component. Referring now to FIG. 11, a perspective view of an optical communication component, in this case an optical transceiver 600, is shown according to an example embodiment of the present invention. The optical transceiver 600 includes an outer housing 620 and a VCSEL 300 for transmitting an optical signal to the end-face of an optical fiber. The outer surface 620A of the transceiver housing 620 includes a substantially circular countersunk aligning cavity 620C. The cup piece 610 has a first end 610A and a second end 610B. The first end 610A includes an opening 610E that is sized and configured to receive an optical fiber end. The second end 110B includes a substantially circular aligning protrusion 610C. The substantially circular aligning protrusion 610C is sized and configured to be closely received within the substantially circular countersunk aligning cavity 620C such that an optical transmission from the VCSEL 300 is aligned relative to an optical fiber end-face of an optical cable received within the opening 610E.

The substantially circular aligning cavity 620C shown in FIG. 11 is manufactured in the outer surface 620A of the housing 620 according to the method of manufacturing described above with reference to FIGS. 8-10. It would be apparent to one of ordinary skill in the art in view of this disclosure that embodiments of the present invention include transceivers incorporating other shapes and configurations of aligning cavities and aligning protrusions, such as that, for example, described with reference to FIGS. 2-7, and others discussed above.

In this case, the transceiver 600 shown in FIG. 8 may be any optical communication component where including the self-aligning interface would be advantageous. The optical component may be included as part of a larger optical network for transmission of data between several fiber optic communication components.

Figure 1:
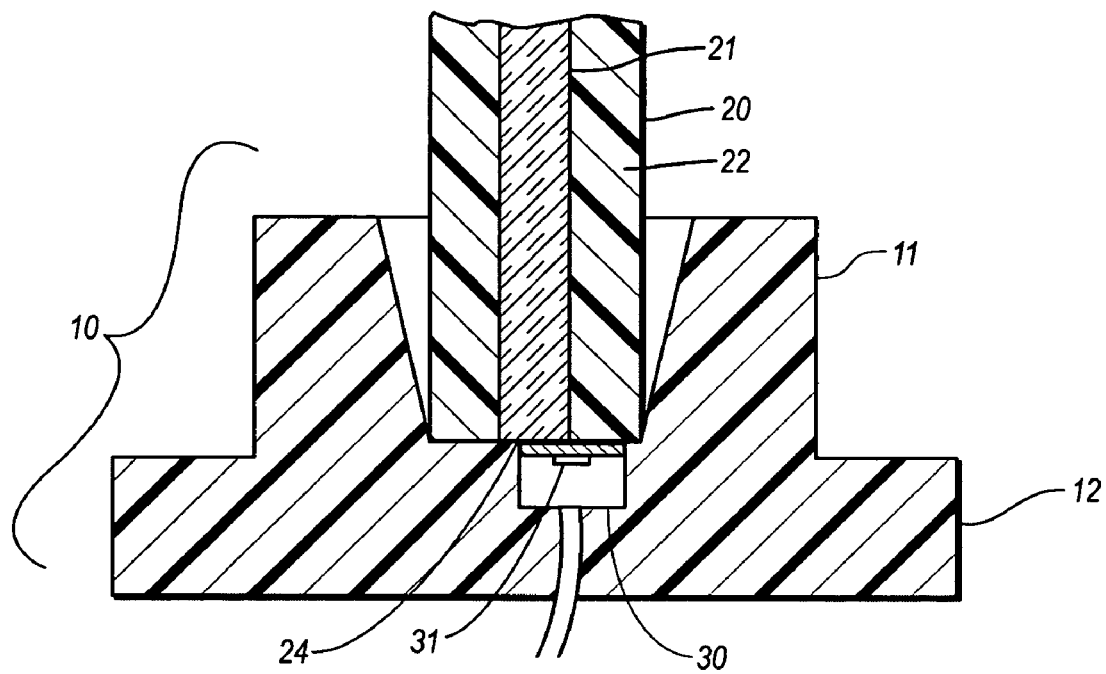
FIG. 1 illustrates a cross-sectional view of a conventional molded-in optical fiber interface for aligning an optical fiber with an active optical device.

Typically, in the case of a misaligned molded-in optical fiber interface (such as that depicted in FIG. 1) the optical component incorporating the misaligned molded-in optical fiber interface must be discarded. Thus, the optical component along with any nonrecoverable components, for example the VCSEL and transceiver housing, would be wasted. However, example embodiments of the present invention may be used to reconfigure an optical component including a misaligned molded-in optical fiber interface and salvage the components.

Figure 12:
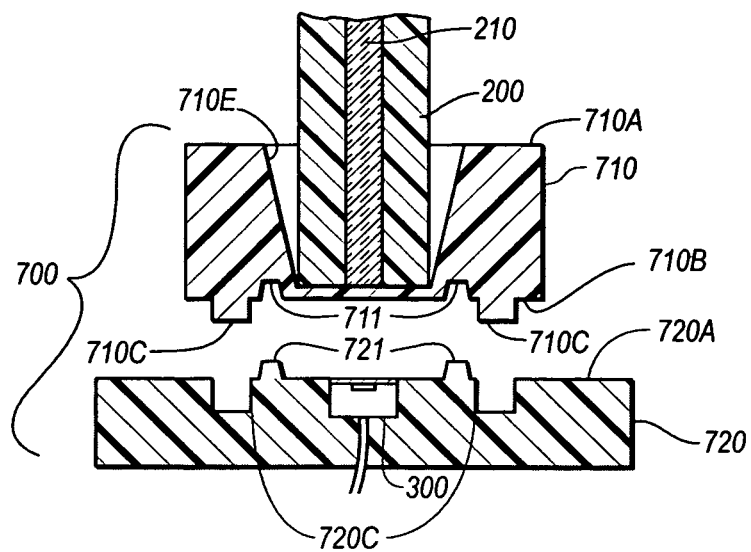
FIG. 12 illustrates a cross-sectional view of a self-aligning optical fiber interface according to an example embodiment of the present invention.

Referring now to FIG. 12, a cross-sectional view of an example embodiment of the present invention is shown including a molded-in optical fiber interface 721 where the overall tolerance of the manufacturing processes, such as molding and die attach, have not been met resulting in an insufficient alignment of fiber 200 relative to VCSEL 300. The self aligning fiber optic interface 700 includes a cup piece 710 and a base piece 720. The base piece 720 may represent, for example, the outer housing of a transceiver or other portion of an optical component or assembly.

Similar to that described and illustrated above with reference to FIGS. 2-6, the cup piece 710 has an open first end 710A that is sized and configured to receive the optical fiber 200, and a closed second end 710B including an aligning protrusion 710C. The base piece 720 has a top surface 720A and a bottom surface 720B. The base piece 720 further includes a substantially circular aligning cavity 720C that is sized and configured to receive the aligning protrusion 710C of the cup piece 710, thereby aligning the emission of the VCSEL 300 with the optical fiber 210.

As shown in FIG. 12, the base piece 720 further includes a molded-in optical fiber interface 721. Prior to altering base piece 720 to include aligning cavity 720C, molded-in optical interface 721 can be used to attempt to align fiber 200 with respect to VCSEL 300. In some cases, using molded-in optical fiber interface 721 provides sufficient alignment of fiber 200 relative to VCSEL 300. However, in other cases using molded-in optical fiber interface 721 may not provide sufficient alignment of fiber 200 relative to VCSEL 300. For example, misalignment of molded-in optical interface 721 can result in unsatisfactory optical power being received at the fiber face of fiber 200 as discussed above with reference to FIG. 1.

In these cases of insufficient alignment, the embodiment of FIG. 12 can be used to improve alignment. This improved alignment can result in increased optical power potentially allowing a part that would otherwise be discarded to be retained and used. To accommodate the molded-in optical fiber interface 721, the second end 710B of the cup piece 710 includes a clearance cavity 711. Clearance cavity 711 is sized and configured to receive the molded-in fiber optic interface 721 and is large enough to provide additional space so that the cup piece may be aligned relative to the VCSEL 300. Manufacture of the aligning cavity 720C may be accomplished using a manufacturing process similar to that described above with reference to FIGS. 4-6 where the aligning cavity 720C is manufactured into the top surface of the base piece 720 and located around the molded-in optical fiber interface 721 as shown in FIG. 12.

It would be apparent to one of ordinary skill in the art in view of this disclosure that a process may be used to remove the molded in optical fiber interface 721 eliminating the need for the clearance cavity 711. Moreover, it would be apparent to one of ordinary skill in the art in view of this disclosure that the molded-in optical fiber interface 721 may be simultaneously removed by the same machining process that creates the aligning cavity 720. For example, the mechanical toolset shown in FIG. 6 may remove the molded-in optical fiber interface 721 and manufacture the aligning cavity 720C at the same location in substantially the same process as that described above with reference to FIG. 6. Such example embodiments are included within the scope of the present invention.

While the aligning cavity 720C and aligning protrusion 710C have been described as having a substantially halo shape, it would be apparent to one of ordinary skill in the art that the aligning cavity 720C and aligning protrusion 710C may have any shape or configuration such as, but not limited to, substantially circular shapes, ribs, pins, fins, as well as other shapes and configurations.

Figure 13:
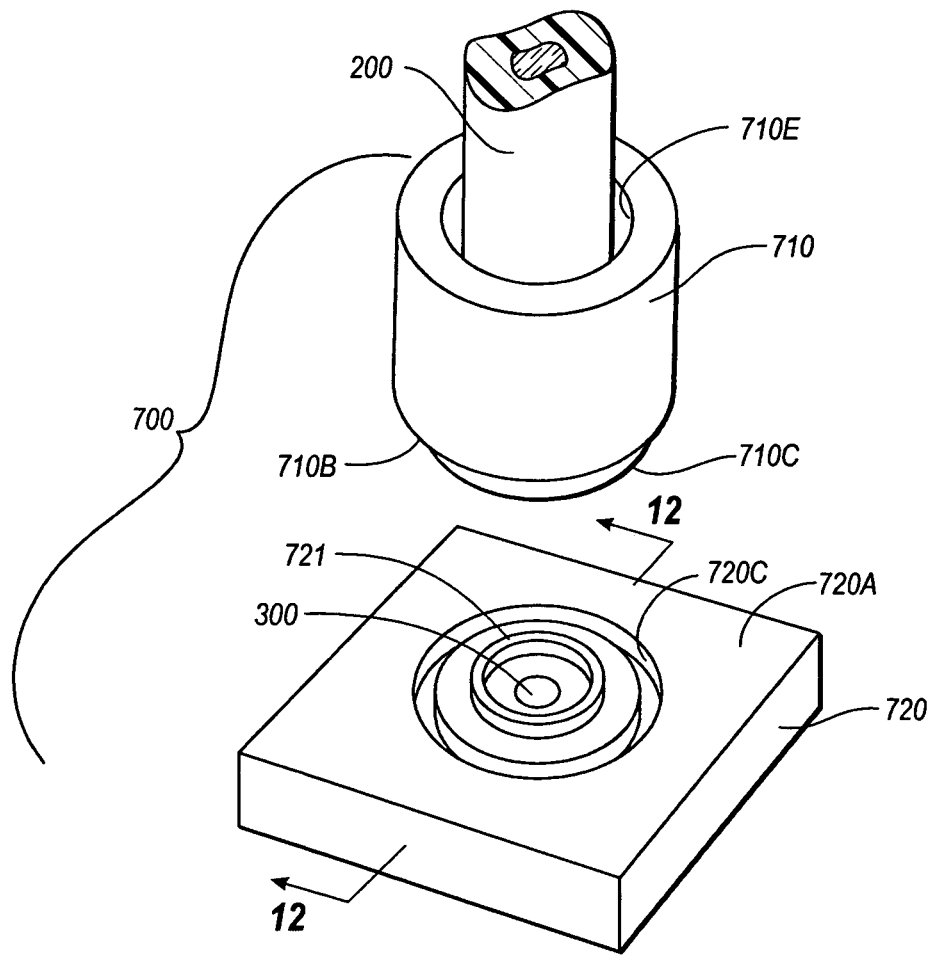
FIG. 13 illustrates a perspective view of a self-aligning optical fiber interface according to an example embodiment of the present invention.

Referring now to FIG. 13, the self-aligning optical fiber interface 700 is shown from a perspective view. As shown in FIG. 13, the self-aligning optical fiber interface 700 comprises a cup piece 710 including a halo-shaped aligning protrusion 710C, and a plate piece 720 including a halo-shaped aligning cavity 720C. The aligning cavity 720C is manufactured around the molded-in optical fiber interface 721. The second end 710B of the cup piece 710 includes a clearance cavity (not visible) that is sized and configured to receive the molded-in optical fiber interface 721, while allowing sufficient space for alignment of the active center of the VCSEL 300 relative to an optical cable 200.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

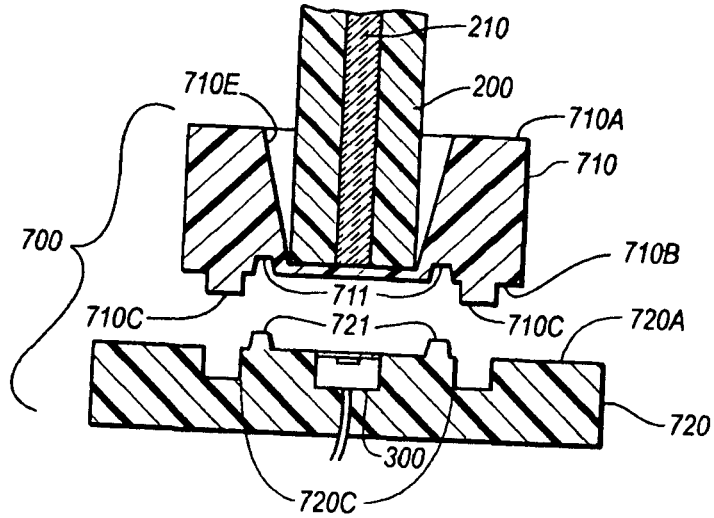

What is claimed is:

1. An optical fiber interface comprising:
   a cup piece including a first end and a second end, the first end including an opening for receiving an optical fiber;
   a base piece including a top surface;
   an active optical device coupled to the base piece, the active optical device including an active center; and
   means for aligning the cup piece about the active center of the active optical device, wherein the base piece is permanently attached to the cup piece after the cup piece is aligned about the active center of the active optical device, wherein the top surface of the base piece includes a molded-in optical fiber interface and the second end of the cup piece includes a clearance cavity that is sized and configured to receive the molded-in optical fiber interface with sufficient clearance to allow for the protrusion to be closely received by the cavity.

2. The optical fiber interface according to claim 1, wherein the aligning means comprises:
   a protrusion located at the second end of the cup piece; and
   a cavity located in the top surface of the base piece, wherein the cavity is sized and configured to closely receive the protrusion.

3. The optical fiber interface according to claim 2, wherein the cavity is substantially halo-shaped and is centered about the active center of the active optical device, and the protrusion is substantially halo-shaped, wherein the protrusion is sized and configured to be closely received by the substantially halo-shaped cavity.

4. The optical fiber interface according to claim 2, wherein the cavity has a substantially circular cross-sectional shape with the active optical device coupled to a bottom surface of the cavity, and wherein the protrusion has a substantially circular cross-sectional shape.

5. The optical fiber interface according to claim 2, wherein the cavity is manufactured by a material removal process that removes material from the top surface of the base piece to create the cavity after the active center is located such that a center of the cavity is aligned with the active center of the active optical device.

6. The optical fiber interface according to claim 2, wherein the active optical device is recessed below a top surface of the base.

7. The optical fiber interface according to claim 2, wherein a second end of the cup piece is closed so that an end of the optical fiber abuts the closed second end of the cup piece when the fiber is received by the opening of the first end of the cup piece.

8. The optical fiber interface according to claim 2, wherein the aligning cavity is manufactured using either a tool having a substantially halo cross-sectional shape or a flat bottom tool.

9. The optical fiber interface according to claim 1, wherein the active optical device is a vertical cavity surface emitting laser ("VCSEL") and the active center is a center of an optical signal transmitted from the VCSEL.

10. The optical fiber interface according to claim 1, further comprising:
    means for attaching the cup piece to the base piece.

11. A transceiver comprising the optical fiber interface according to claim 1.

12. The optical fiber interface according to claim 1, wherein the cup piece is permanently attached to the base piece by epoxy, screws, bolts, press-fit engagements, snap-fit engagement, adhesives, or welds.

13. A fiber optic component comprising:
    a housing including an outer surface;
    an active optical device coupled to the housing;
    a optical fiber interface, the optical fiber interface comprising:
       an aligning cavity located in the outer surface of the housing; and
       a cup piece comprising:
          a first end including an opening that is sized and configured to receive an optical fiber; and
          a second end including an aligning protrusion that is sized and configured to be received within the aligning cavity, thereby aligning the active optical device with an optical fiber received by the cup piece, wherein the cup piece is permanently attached to the housing, wherein the outer surface of the housing includes a molded-in optical fiber interface and the second end of the cup piece includes a clearance cavity that is sized and configured to receive the molded-in optical fiber interface with sufficient clearance for alignment of an optical fiber received by the cup piece relative to the active optical device.

14. The fiber optic component according to claim 13, wherein the fiber optic component is an optical transceiver.

15. The fiber optic component according to claim 13, wherein the cup piece is attached to the housing such that the aligning protrusion is received by the aligning cavity.

16. The fiber optic component according to claim 13, wherein the aligning protrusion and the aligning cavity are both substantially halo-shaped.

17. The fiber optic component according to claim 13, wherein the aligning protrusion and the aligning cavity are both substantially circular shaped.

* * * * *

UNITED STATES PATENT AND TRADEMARK OFFICE
CERTIFICATE OF CORRECTION

PATENT NO. : 7,418,175 B2
APPLICATION NO. : 11/086146
DATED : August 26, 2008
INVENTOR(S) : Aizpuru et al.

It is certified that error appears in the above-identified patent and that said Letters Patent is hereby corrected as shown below:

Delete Title Page, and substitute new Title Page. (attached)

Face
Change Primary Examiner from "Kianni C. Kaveh" to --Kaveh C. Kianni--

Drawings
Please replace the current drawing of Fig. 12 with the figure depicted below in which the "bottom surface 720B" is labeled.

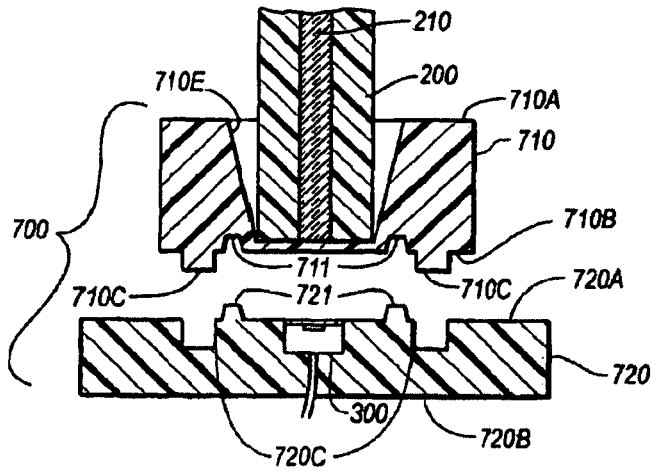

Fig. 12

Column 1
Line 26, change "(known" to --known--

Signed and Sealed this

Twenty-third Day of November, 2010

David J. Kappos
*Director of the United States Patent and Trademark Office*

Column 4
Line 7, change "optical" to --optical device--
Line 30, change "description, include the claims" to --description and accompanying claims--

Column 5
Line 19, delete "a"

Column 7
Line 48, change "110B" to --610B--

(12) United States Patent
Aizpuru et al.

(10) Patent No.: US 7,418,175 B2
(45) Date of Patent: Aug. 26, 2008

(54) COMPONENT FEATURE CAVITY FOR OPTICAL FIBER SELF-ALIGNMENT

(75) Inventors: Jose Joaquin Aizpuru, Murphy, TX (US); Danny Robert Schoening, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 29 days.

(21) Appl. No.: 11/086,146

(22) Filed: Mar. 22, 2005

(65) Prior Publication Data

US 2006/0051029 A1 Mar. 9, 2006

Related U.S. Application Data

(60) Provisional application No. 60/608,488, filed on Sep. 9, 2004, provisional application No. 60/617,315, filed on Oct. 8, 2004.

(51) Int. Cl.
*G02B 6/42* (2006.01)
*G02B 6/12* (2006.01)
(52) U.S. Cl. .................... 385/52; 385/14; 385/15
(58) Field of Classification Search ............ 385/14–15, 385/52
See application file for complete search history.

(56) References Cited

U.S. PATENT DOCUMENTS

| 6,015,239 A * | 1/2000 | Moore ............ 385/92 |
| 7,084,496 B2 * | 8/2006 | Benner et al. ...... 357/730 |
| 2004/0022487 A1 * | 2/2004 | Nagasaka et al ...... 385/31 |
| 2004/0228588 A1 * | 11/2004 | Eldring et al. ........ 385/94 |

* cited by examiner

*Primary Examiner*—Kianni C Kaveh
(74) *Attorney, Agent, or Firm*—Workman Nydegger

(57) ABSTRACT

Optical fiber interfaces, apparatuses including the optical fiber interfaces, and methods for manufacturing the optical fiber interfaces. Optical fiber interfaces comprise a cup piece and a base piece. The cup piece includes an open first end for receiving an optical fiber end, and a second end includes an aligning protrusion. The base piece includes a top surface with an aligning cavity and an active optical device coupled to the base piece. The cup piece may be attached to the base piece. The base piece may be part of an outer housing portion of a transceiver or other optical component. The base piece may include a molded-in optical fiber interface and the cup piece may include a clearance cavity. A method for making the optical fiber includes locating the center of the active optical device and manufacturing the aligning cavity into the top surface of the base piece.

17 Claims, 7 Drawing Sheets